(12) United States Patent
Altarescu

(10) Patent No.: US 7,392,220 B1
(45) Date of Patent: Jun. 24, 2008

(54) SELLER RISK AUCTION PLATFORM

(75) Inventor: Howard Altarescu, Chappaqua, NY (US)

(73) Assignee: Goldman, Sachs & Co., New York, NY (US)

( * ) Notice: Subject to any disclaimer, the term of this patent is extended or adjusted under 35 U.S.C. 154(b) by 659 days.

(21) Appl. No.: 09/826,479

(22) Filed: Apr. 4, 2001

Related U.S. Application Data

(60) Provisional application No. 60/194,918, filed on Apr. 4, 2000.

(51) Int. Cl.
    *G06Q 40/00* (2006.01)

(52) U.S. Cl. .............................. 705/38; 705/35; 705/36; 705/37

(58) Field of Classification Search .............. 705/35–38
    See application file for complete search history.

(56) References Cited

U.S. PATENT DOCUMENTS

| | | | | |
|---|---|---|---|---|
| 5,704,045 A | * | 12/1997 | King et al. | 705/35 |
| 6,134,536 A | * | 10/2000 | Shepherd | 705/37 |
| 6,317,727 B1 | * | 11/2001 | May | 705/37 |
| 6,360,210 B1 | * | 3/2002 | Wallman | 705/36 |

OTHER PUBLICATIONS ebay.com webpages (85 pages).*
Martin Bichler Trading Financial Derivatives on the Web—An Approach Towards Automating Negotiations on OTC Markets, Apr. 2000.*
Sam Kinney ("RIP fixed pricing: The Internet is on its way to "marketizing" everything", Business Economics. Washington: Apr. 2000. vol. 35, Iss. 2; p. 39, 6 pgs).*

* cited by examiner

*Primary Examiner*—Harish T. Dass
(74) *Attorney, Agent, or Firm*—Chadbourne & Park LLP; Walter G. Hanchuk

(57) ABSTRACT

A method and system to implement a periodic auction by a seller of risk through a website for the purpose of transferring specific risks authorized by seller under its medium-term and long-term guarantee and medium-term insurance programs. A computerized communications network, such as the Internet, is used as a vehicle for implementing a seller risk auction. A website is utilized to present auction data and terms as well as auction rules and procedures. In addition, relevant information regarding an exposure can be posted on the website at the time the exposure is auctioned. The website can be interactive to ascertain that a potential bidder is an qualified counterparty.

13 Claims, 2 Drawing Sheets

US 7,392,220 B1

SELLER RISK AUCTION PLATFORM

CROSS-REFERENCE TO RELATED APPLICATIONS

This application claims priority to U.S. provisional patent application No. 60/194,918 filed Apr. 4, 2000 and entitled "Seller Risk Auction Platform."

BACKGROUND

The present invention relates generally to an on-line risk auction system. In particular, the present invention relates to a method-end system for auctioning risk associated with a financial transaction via a distributed network.

A certain amount of risk exposure is associated with selling financial instruments, and in particular with medium and long term guarantees and medium term insurance policies. It would be most efficient to be able to transfer risk associated with such transactions in an expeditious and convenient manner.

A facility chosen by a seller to complete a transaction should assure be able seller of a competitive and least expensive execution. This can best be accomplished at the point in time when there is the greatest transparency with regard to the exposures. At the current time, there is no way to know which exposures will be authorized by a seller during an authorization period, the concentration of those exposures or the terms of those exposures. Presently, there is no way to know the market conditions which will prevail when such exposures are authorized.

What is needed is a method and system to create a forum to offer to transfer risk exposure and also to receive bids from qualified bidders, accept a bid and transfer the risk exposure.

SUMMARY

Accordingly, the present invention provides a method and system to implement an auction by a seller of risk through a dedicated website (the "Seller Risk Auction") for the purpose of transferring specific risks to be authorized by Seller under its medium-term and long-term guarantee and medium-term insurance programs ("Exposures"). A computerized communications network is used as a vehicle for implementing the seller risk auction.

In light of the uncertainty as to the nature of certain exposures which may be originated during an authorization period, an effective and cost efficient way for a Bank to transfer risk under its medium-term and long-term guarantee and medium-term insurance programs is to transfer such risks at such time as the underlying risk is identified and the terms are established.

A Risk Auction website of this invention can contain auction rules and procedures. In addition, relevant information regarding an exposure can be posted on the website at the time the exposure is auctioned.

The present invention can be used to auction the risks assumed by a Seller in connection with medium-term and long-term guarantee medium-term insurance programs, or other programs. Pursuant to these programs, Seller assumes credit and political risk of sovereign, public agency and private sector credits. These institutions borrow funds, or guarantee borrowings, from commercial Sellers, which borrowings are guaranteed or insured by Seller. The Seller's risk is that there will be a default on the loan made by the commercial Seller, in which case a payment will be required to be made by Seller to the commercial Seller.

DETAILED DESCRIPTION

A Seller of risk or financial institution that provides financial services can facilitate the transfer of risk associated with conducting business by auctioning off the risk associated with a particular transaction, such as credit derivative markets for emerging markets credits, via a computer implemented auction system. In one embodiment, the present invention transfers risk associated with medium-term and long-term guarantee and medium term insurance programs. Typically, a transaction will be consummated via a communications network by participants operating a network access device, such as a computer.

Figure 1:
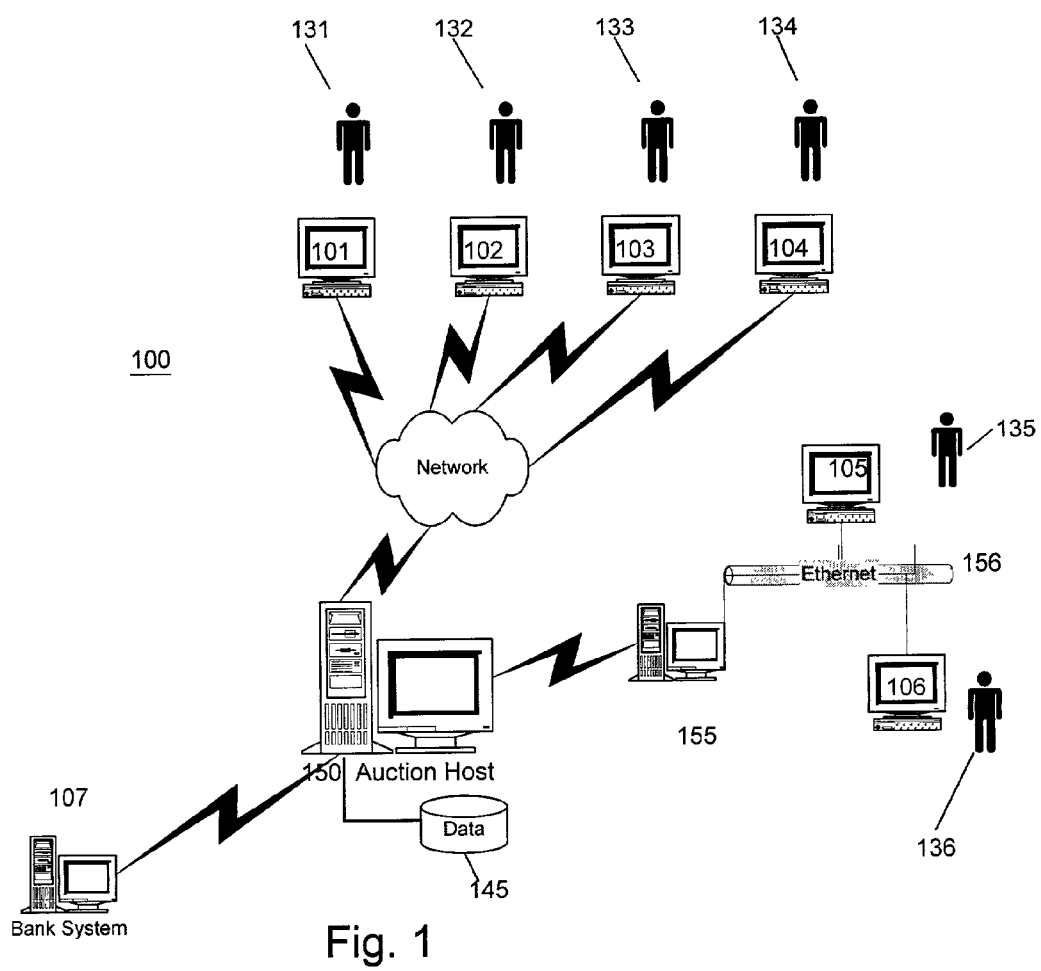
FIG. 1 illustrates the components of a computer network system which can embody this invention.

FIG. 1 shows a network of computers 100 that may be used in an implementation of an online risk auction system. The network 100 can include a host system 150 and auction participant computers 101-106. Each of the auction participant computers can include a processor, memory, a user input device, such as a keyboard and/or mouse, and a user output device, such as a video display, flat panel display and/or a printer. The auction participant computers 101-106 can communicate with the host 150 to exchange transaction information. The transaction information can be stored as data on a storage medium 145 at the host 150. An auction participant 131-136 operating an auction participant computer 101-106 may bid in an online risk auction. The risk auction can be effected with a host computer 150, or details of the risk auction transaction can be transmitted to a host computer 150.

The host 150 may include multiple processing and database subsystems, such as cooperative or redundant processing and/or database servers, which can be geographically dispersed throughout the network 100. In some implementations, groups of e-commerce participant computers 105-106 may communicate with a host 150 through a local network 156. The local network 155 can also include a local server such as a proxy server or a caching server.

The host computer 150 includes one or more databases 145 storing auction transaction information and applications. A large variety of auction related files may be stored at the host 150; for example, text, data audio, video, graphics, animations, and illustrations. In addition, the host 150 may interact with, and gather data from a commerce participant via an e-commerce participant computer 101-106. Data gathered from the commerce participant may be used to conduct e-commerce and/or to project future sales.

An auction participant such as a facility participant can access the host 150 using software executed at an auction participant's computer 101-106. The software may include a generic hypertext markup language (HTML) browser, such as Netscape Navigator or Microsoft Internet Explorer, (a "WEB browser"). The software may also be a proprietary browser, and/or other host access software. In some cases, an executable program, such as a Java™ program, may be downloaded from the host 150 to the auction participant computer and executed at the auction participant computer as part of the auction transaction.

In light of the uncertainty as to the nature of certain exposures which will may be originated during an authorization period, an effective and cost efficient way for a Seller to transfer risk under its medium-term and long-term guarantee and medium-term insurance programs is to transfer such risks at such time as the underlying risk is identified and the terms are established.

The Seller Risk Auction Website of this invention can contain auction rules and procedures. In addition, all relevant information regarding an Exposure would be posted on the Website at the time the Exposure is auctioned. Such information may include: Name of Obligor, Commitment Fee, Risk Type (Credit/Political/Both), Draw Down Period, Program, Scheduled Shipment Dates, Term of Exposure, Seller, Exposure Amount, Exporter, Exposure Fee, Product although Trade Secret or other statutes may preclude disclosure of some information. Facility participants have the opportunity to bid on the specific risks posted at a particular point in time. Bids may be based on the Yield Required (expressed as a fixed yield or as a spread to a designated benchmark) and/or a maximum notional amount of exposure which is acceptable.

The Seller does not need to be under obligation to accept any bid. The Seller can also determine which bid, if any, to accept based on the lowest yield required by the bidders. A dealer can assist Seller in evaluating the bids. If the dealer participates as a principal in any auction (as discussed below), the bids submitted in such auction can be disclosed to Seller only.

In one embodiment, the bidders can be a group of pre-screened participants that meet Seller's credit criteria and have agreed to a form of Auction termed documentation, such as credit derivative documentation, related ISDA Master Agreement or Reinsurance Documentation, as applicable (terms).

The auction can be open to all institutions which meet the criteria of a Seller and/or dealer. Acceptable bidders can be designated "Qualified Counterparties", and as such can encompass capital markets investors as well as insurers and re-insurers. Upon sellers acceptance of a bid, the facility participant(s) whose bid(s) has been accepted and Seller would be deemed to have agreed to the Terms. As the Terms would be in place at the time of bid, Seller would be able to transfer the specified risk at the time of acceptance of a bid.

The use of the website to market exposures related to the auction will facilitate evaluation of exposures on a timely manner and has the potential to broaden the base of facility participants in the U.S. and abroad.

A dealer can actively participate as principal in the proposed facility. However, in order to avoid the appearance of conflict from acting as a marketing agent and having the ability to bid, the dealer should be prepared to implement appropriate ethical ("Chinese") wall procedures.

An auction website may be hosted and owned by a seller, by a dealer, or by a third party. Seller's views regarding the desire to manage and control the website, restrictions on access, conflicts, and other issues, should be considered in order for a decision to be made in this regard.

In various embodiments, a dealer can receive indemnification from the Seller, and/or a dealer can receive an Exposure fee for Exposures transferred by Seller.

A facility chosen by Seller will preferably be capable of adapting to the changing nature of the risks assumed by Seller. A Seller Risk Auction according to the present invention can have the capability of marketing all Exposures authorized by Seller, without regard to concentration limits or any other factors.

A Seller Risk Auction facility facilitates competitive and least expensive execution by marketing specific exposures to a broad base of institutions. At the time an Exposure is marketed through the Seller Risk Auction, the uncertainty premium charged by investors to Seller will be minimized to the greatest possible extent. All relevant information with respect to a particular Exposure that may legally be disclosed can be made available to all Qualified Counterparties.

Seller's Invitation to Submit Proposals indicates that the period between authorization of a particular transaction and payment of the Exposure fee for that transaction may be impossible to predict and that this period may span months or years for a given transaction. The class of transactions, if it exists, can be identified. Initially, proposed facility participants may be more likely to bid on transactions with shorter draw down periods. Facility participants may not be receptive to providing a commitment, without a fee, in exchange for a risk premium which may not be received for some uncertain period of time over a span of months or years and which would not be received at all if the underlying transaction is cancelled.

In order to meet a Seller's objective to transfer risk at the time of authorization of an Exposure, facility participants may be permitted to submit bids based on a spread to a designated benchmark as of the date the Exposure fee is actually payable. Seller would then bear the market price risk between the time of authorization and the time that the exposure fee is payable. The Exposure will still have been transferred at the time of authorization. Facility participants are likely to want some degree of certainty that the Exposure Fee will be paid within some specified period of time.

In one embodiment a Seller Risk Auction facility can be dedicated to medium-term and long-term loan guarantees and medium-term insurance policies, coverage for an Exposure to which Seller has accepted a bid will attach at the time the bid is accepted by Seller. Prior to such time, the required details of the guaranteed or insured transaction will have been posted on the designated website. The terms of the bid will provide that, upon notification of acceptance, the winning bidder and Seller will be deemed to have agreed to the Terms, previously agreed to by Seller and such bidder.

The Seller Risk Auction bid procedures can require that all types of risks (i.e., credit risk and political risk) authorized by Seller under the terms of any covered guarantee or insurance policy be transferred to or shared with the facility participants; in the case of sharing of such risks, the participant's proportional share of each such type of risk shall be the same. The market for political risk (without credit risk) is generally a different market than the credit default market and may require different documentation and marketing.

The Seller Risk Auction facility does not require the provision of any credit enhancement or other support for participants on the part of the United States or any agency or department thereof, other than the payment of all or a portion of the Exposure Fee otherwise payable to Seller.

The Seller can use fees as a source of income to pay or enhance (as the case may be) the return to participants in the proposed facility, which can be some portion of the Exposure Fee actually paid in respect of covered guarantees and insurance policies authorized during the period beginning upon the commencement of the proposed facility. The portion of an Exposure transferred as well as the portion of the Exposure Fee required will be a function of the Yield bid and the notional amount bidders are willing to acquire.

The credit derivative market for emerging markets credits can include dealers, international and regional commercial Sellers, insurance and reinsurance companies, as well as money managers and hedge funds. The risks to be transferred through Seller Risk Auctions can be transferred to these dealers and other institutions which meet the criteria for Qualified Counterparties described below.

Qualified Counterparties can be expected to evaluate pricing beginning with the existing secondary market benchmarks for related public bonds.

The pricing for a particular Exposure can have a direct impact on the amount of the Exposure Fee otherwise payable to Seller that will be required to be ceded or paid to facility participants. To the extent that a facility participant requires a yield higher than the fee charged by Seller, the portion of the Exposure subject to a bid would be less than 100%.

A facility participant may require a yield higher than the fee charged by Seller (on a yield basis) to account for the participant's view of the credit risk of the Exposure, to reflect the relative illiquidity of credit default swaps compared to public bonds, to account for any uncertainty as to when or whether the Exposure Fee will be paid, or for any other reason. Each bid will provide that the participant will be paid all of the Exposure Fee bid that is paid to Seller on a particular credit until the participant has received the Yield Required.

The amount and nature of risk to be retained by Seller under the Seller Risk Auction facility will be a function of the competitive bids made by participants. The amount of risk to be retained will be a function of the Exposure Fee to be received on the risk and the Yield Required by the participants.

Taking as an example a $50 million 7 yr export-import sovereign Exposure to Korea, the Exposure Fee would be 349 bps ($1.745 million). Assuming that the participant takes 50% of the Exposure amount, the percentage of the Exposure Fee taken by the participant would range from 38.2% to 63.6% depending on the Yield Required. (This analysis also assumes that the Exposure is effective at the outset and that the portion of the Exposure Fee due to the participant is received at the outset.)

several foreign jurisdictions. In addition, a dealer could establish and license a property and casualty insurance intermediary.

In addition, the transfer of risks through the Seller Risk Auction facility may implicate the securities laws of various jurisdictions. A dealer in consultation with Seller's counsel, can structure all auctions to comply with such laws.

Credit Derivative Transactions can be structured and offered in a manner that will comply with all applicable federal, state and foreign laws and regulations, including, but not limited to, those relating to securities and commodities. Standard industry documentation can also be used for the transactions, including the 1992 ISDA Master Agreement (Multicurrency—Cross Border) and the 1999 ISDA Credit Derivative Definitions, with such amendments thereto as may be agreed with Qualified Counterparties. Each Qualified Counterparty to a Credit Derivative Transaction can be required to meet the requirements for an "eligible swap participant" as defined in 17 CFR 35.

Reinsurance Transactions can be structured and offered in a manner that will comply with all applicable federal, state and foreign laws and regulations governing, among other things, the power and authority of reinsurance companies to enter into the Reinsurance Transactions and the activities constituting the intermediation of such transactions. The Reinsurance Agreement can contain terms and conditions customary in the insurance and reinsurance industry and as may be agreed with Qualified Counterparties.

Minimum financial strength and sophistication requirements for participants in the Seller Risk Auction facility can be established based on consultation with Seller. If acceptable to Seller, counterparties that would otherwise be qualified,

| Yield Required | Spread Required in bps over UST | Spread Required in bps over Libor | Exposure taken by Bidder | % of Total Exposure taken by Bidder | Fee taken by Bidder | % of Total Fee taken by Bidder |
|---|---|---|---|---|---|---|
| 8.00% | 150 bps | 75 bps | $25 MM | 50% | $0.67 MM | 38.2% |
| 8.25% | 175 bps | 100 bps | $25 MM | 50% | $0.89 MM | 50.9% |
| 8.50% | 200 bps | 125 bps | $25 MM | 50% | $1.11 MM | 63.6% |

The ceding/payment of Exposure Fees can be minimized to the extent that the following conditions apply: the risks transferred have relatively high Exposure Fees, the related underlying credits trade at relatively tight spreads; and there is certainty as to when Exposure Fee payments will be made. One of the strongest features of the Seller Risk Auction facility is the likelihood of competitive pricing as each risk to be transferred will be marketed to as many prospective participants as possible. The market for Exposures will have the potential to increase as more institutions become familiar and comfortable with Seller's programs.

A Seller Risk Auction facility should be structured so that it falls within the applicable exemptions and safe harbors from Commodity Exchange Act regulation. Each auction should be structured in a manner consistent with applicable securities laws in the U.S. and abroad. The transfer of risks through the sale of insurance and reinsurance products through the Seller Risk Auction facility may require the use of licensed insurance and reinsurance intermediaries. The dealer or its affiliates should be licensed to act as a reinsurance intermediary in nearly all the states of the United States and except for concerns regarding credit risk may become Qualified Counterparties by posting collateral in amounts and on terms agreed to by Seller.

Financial strength and sophistication requirements should be set at a level high enough to provide comfort to Seller, but not so high as to unduly limit the number of prospective participants. Access to the Risk Auction website can be limited to Qualified Counterparties.

Figure 2:
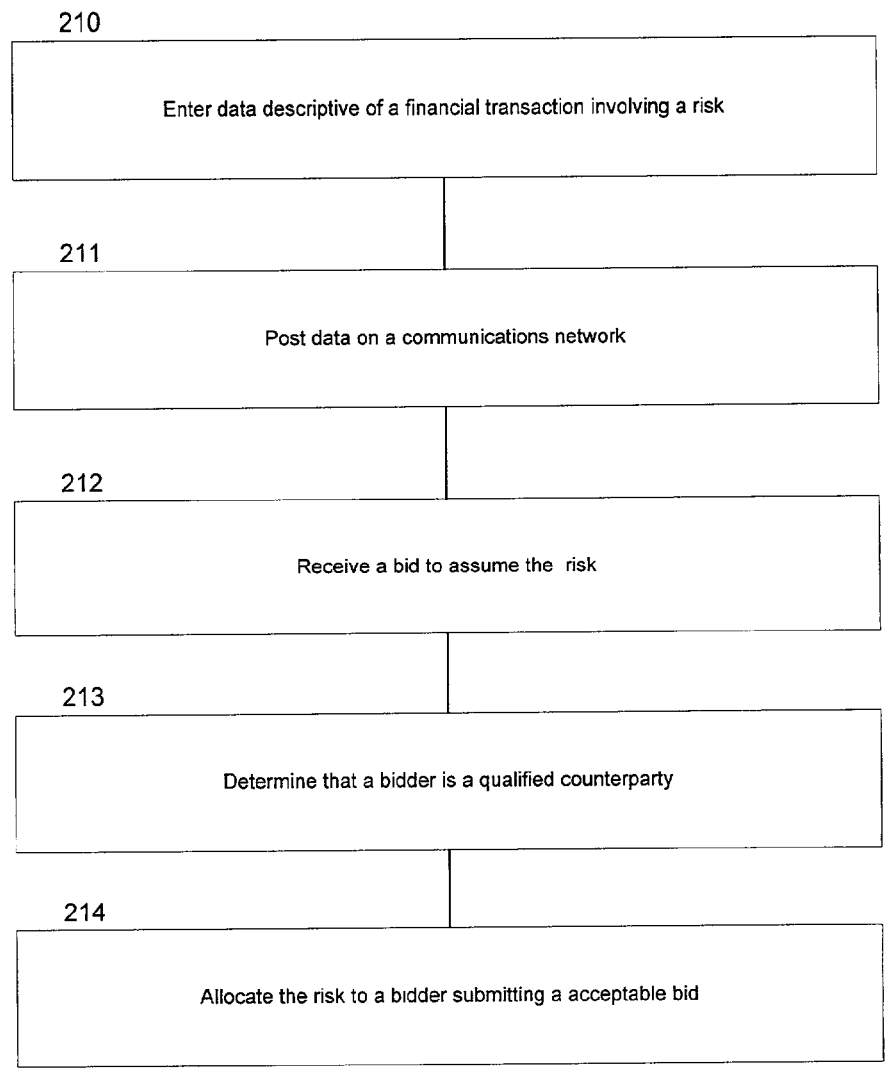
FIG. 2 illustrates steps that can be taken to implement a seller risk auction.

Referring now to FIG. 2, a user of the present invention can enter data descriptive of a risk into a risk auction host computer and relate the data to a financial transaction 210. The host computer can present the data on a communications network such that it can be viewed by a potential bidder 211. The bidder can make a bid to assume the risk via a network access device such that the host computer will receive the bid. The host computer can also determine that a bidder is a qualified counterparty 213 and allocate the risk to a bidder submitting a acceptable bid 214.

Technology used to implement an online risk auction can include software which can be based on a Currency Exchange Institution's UNIX/Windows NT risk management system. Transmission of auction data from the client to a auction host provider or other institution that provides the service of providing an online risk auction can be accomplished with a distributed network such as the Internet, over the telephone or email via proprietary API or in a standardized format (standard text formatted in a pre-agreed way). Additionally it may be passed directly into an electronic trading system via an electronic format.

The invention may be manifested in digital electronic circuitry, or in computer hardware, firmware, software, or in combinations of them. Apparatus of the invention may also be implemented in a computer program product tangibly embodied in a machine-readable storage device for execution by a programmable processor; and method steps of the invention may be performed by a programmable processor executing a program of instructions to perform functions of the invention by operating on input data and generating output.

One or more computer programs can be executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments of the present invention have been described. Nevertheless, it will be understood that various modifications may be made without departing from the spirit and scope of the invention. For example, computers 101-106 can comprise a personal computer executing an operating system such as Microsoft Windows™, Unix™, or Apple MacOS™, as well as software applications, such as a web browser. Customer computers 101-106 can also be terminal devices, a palm-type computer web access device that adhere to a point-to-point or network communication protocol such as the Internet protocol. Other examples can include terminals, and wireless access devices (such as a 3-Com Palm VII organizer). A participant computer may include a processor, RAM and/or ROM memory, a display capability, an input device and hard disk or other relatively permanent storage. Accordingly, other embodiments are within the scope of the following claims. Similarly, the host system 150 and the auction system can be any computer system known to those skilled in the art.

What is claimed is:

1. A computer implemented method for auctioning risk associated with a financial transaction, the method comprising:
   entering data descriptive of a risk relating to a financial transaction into a risk auction host computer;
   presenting the data on a communications network;
   receiving a bid to assume a portion of the risk as part of a risk transaction into the host computer, wherein the bid is based on a yield required;
   ensuring compliance of the risk transaction with a set of risk auction rules and procedures applicable to a relevant category of risk transactions; and
   allocating the portion of the risk to a bidder submitting an acceptable bid for compliant transactions.

2. The method of claim 1, wherein the financial transaction relates to a credit derivatives market.

3. The method of claim 1, wherein the financial transaction relates to a medium term or long term guarantee.

4. The method of claim 1, wherein the financial transaction relates to a medium term insurance.

5. The method of claim 1, wherein the data is presented on a website via the Internet.

6. The method of claim 1, wherein the communications network comprises the Internet.

7. The method of claim 1, additionally comprising the step of basing bids upon a maximum notional amount.

8. The method of claim 1, additionally comprising the step of designating bidders as qualified counterparties according to a predetermined set of criteria.

9. A computer communications system for auctioning risk associated with a financial transaction, the system comprising:
   a computer communications server accessible with a network access device via a communications network; and
   executable software stored on the server and executable on demand via the network access device, the software operative with the server to:
   enter data descriptive of a risk relating to a financial transaction into a risk auction host computer;
   present the date on a communications network;
   receive a bid to assume a portion of the risk as part of a risk transaction into the host computer, wherein the bid is based on a yield required;
   ensure compliance of the risk transaction with a set of risk auction rules and procedures applicable to a relevant category of risk transactions; and
   allocate the portion of the risk to a bidder submitting an acceptable bid for compliant transactions.

10. Computer executable program code residing on a computer-readable medium, the program code comprising instructions for causing the computer to:
    enter data descriptive of a risk relating to a financial transaction into a risk auction host computer;
    present the data on a communications network;
    receive a bid to assume a portion of the risk as part of a risk transaction into the host computer, wherein the bid is based on a yield required;
    ensure compliance of the risk transaction with a set of risk auction rules and procedures applicable to a relevant category of risk transactions; and
    allocate the portion of the risk to a bidder submitting an acceptable bid for compliant transactions.

11. A computer data signal embodied in a digital data stream comprising data including details of risk relating to a financial transaction, wherein the computer data signal is generated by a method comprising the steps of:
    entering data descriptive of a risk relating to a financial transaction into a risk auction host computer;
    presenting the data on a communications network;
    receiving a bid to assume a portion of the risk as part of a risk transaction into the host computer, wherein the bid is based on a yield required;
    ensuring compliance of the risk transaction with a set of risk auction rules and procedures applicable to a relevant category of risk transactions; and
    allocating the portion of the risk to a bidder submitting an acceptable bid for compliant transactions.

12. A processor-implemented method for auctioning risk, comprising:
    receiving data into a risk auction host computer, wherein the data is descriptive of an underlying risk relating to a financial transaction selected from the group consisting of a credit derivatives market, a medium term or long term guarantee, and a medium term insurance;
    presenting the data and a set of risk transaction terms on a website via the internet;

receiving a bid from an auction participant to assume a portion of the underlying risk as part of a risk transaction into the host computer, wherein the bid is based on a yield required;

receiving a set of auction participant qualification data descriptive of an auction participant's financial characteristics;

comparing the set of auction participant qualification data to a set of qualification requirements, the qualification requirements establishing a minimum baseline of financial strength required of the auction participant; and for qualified auction participants:

ensuring compliance of the risk transaction with a set of risk auction rules and procedures applicable to a relevant category of risk transactions; and allocating the portion of the underlying risk to the auction participant submitting an acceptable bid for compliant transactions at such time that the underlying risk and the risk transaction terms are established.

13. The method of claim 12, wherein the bid is based on a spread to a designated benchmark as of a date at which an exposure fee is payable for assuming the underlying risk, and wherein a seller of the underlying risk bears market price risk for a period between assumption of the underlying risk and payment of the exposure fee.

\* \* \* \* \*